H. A. PHILLIPS.
Making Watch and Locket Rims.
No. 17,515.
Patented June 9, 1857.
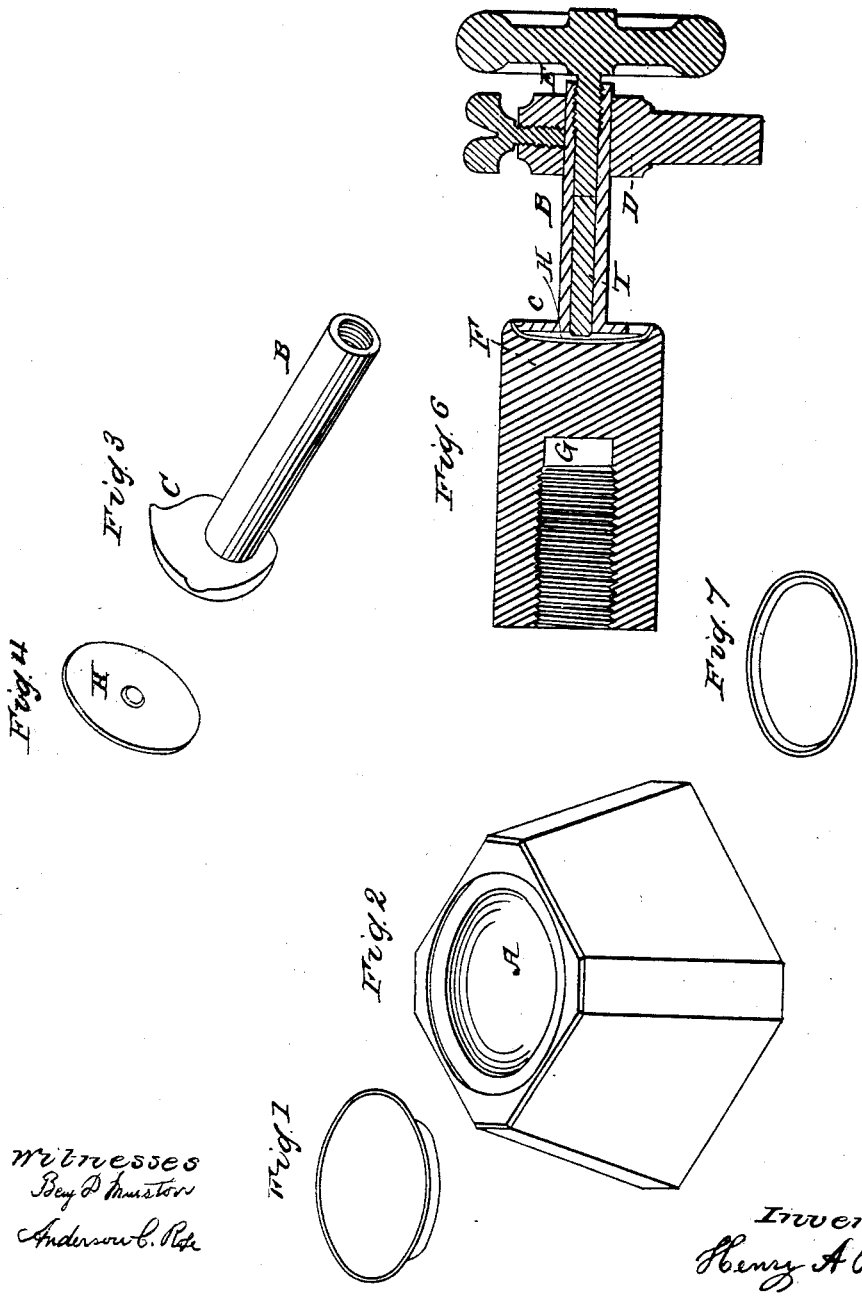

UNITED STATES PATENT OFFICE.

HENRY A. PHILLIPS, OF PROVIDENCE, RHODE ISLAND.

WATCH AND LOCKET RIM.

Specification of Letters Patent No. 17,515, dated June 9, 1857.

*To all whom it may concern:*

Be it known that I, HENRY A. PHILLIPS, of the city and county of Providence, in the State of Rhode Island, have invented a new and improved method of forming the rims of watch and locket cases from the same sheet metal of which each half-case is composed without the use of solder; and I do hereby declare that the following is a full and exact description thereof, reference being had to the accompanying drawings and to the letters of reference marked thereon.

The same letters in the different figures indicate like parts.

Hitherto snap and spring cases for watches and lockets have been usually made by first forming the rims or rings of the cases from wire drawn to the proper size and shape—cut of the proper length—the ends soldered together and then shaped on a mandrel; the backs are then struck up in a die—spring into the rims and the joint closed with solder. Two half cases so made are then hinged together. The process thus employed embracing a number and a variety of mechanical operations is necessarily long, and where other than an expensive article is made the union of the several parts is effected by the use of soft solder.

The nature of my invention consists in forming the rim of every variety of such metallic case from the same sheet metal of which the back is composed without the use of solder to unite the back and rim together and without a joint in any of the parts, whereby a great saving in labor and economy in material is effected while a much better and more desirable article of manufacture is produced.

To enable others to understand and use my invention I will proceed to describe the method which I employ and the means by which it is accomplished.

I take a piece of sheet metal of the desired thickness for the proposed case and by the use of a steel die of the desired size and form strike up the metal in an ordinary press, the form which the metal will in consequence assume is represented in Figure 1, the shape of the case and the height of the rim at this stage of the operation being determined by the form and depth of the die. I then place the half case so struck up in a chuck of hard wood or other suitable material (F Fig. 6) which chuck is secured on to the spindle of a lathe head (G Fig. 6) or a revolving wheel. I then take a tool of which the following is a description.

B Fig. 3 is a hollow shank of metal of any convenient size having a thread, E, tapered in one end of it, into which the screw E Fig. 6 is fitted as this screw is turned it will force out farther the spindle I Fig. 6 placed in the hole of the shank (B Fig. 3, and Fig. 6) on the other end of the shank. B Fig. 3, is screwed or otherwise adjusted so as to be readily removed. A steel burnisher, C, the burnishing edge of which is so shaped as to give the desired form of angle or curvature to the rim of the case. The periphery of the burnisher should be somewhat less than a semicircle in order that it may be readily withdrawn from the case after the rim is formed—a shape similar to that represented in the drawing C Fig. 3 I have found as good as any. I then bring this burnisher in contact with the half case which has been chucked in the manner above stated by holding the shank B″ in a post D Fig. 6 with a thumb screw and placing the post with the burnisher so fixed in the tool post socket of an ordinary lathe or in any other manner so that the center line of the shank of the burnisher shall be coincident with the axis of revolution of the half case, held or checked as described. The radius of the burnisher C Fig. 3, should be in proportion to the size of the rim to be made. I then place a circular metallic washer Fig. 4 having through its center a hole, H, into which the end of spindle I, Figs. 3, and 6, easily fits against the inside of the case to be operated on and by means of the screw E Fig. 6 the spindle I is pressed against the washer H, Fig. 6, and the case steadily held in the chuck. The chuck with the case in it is then revolved and the burnisher remains stationary. I then press a hand burnisher or any smooth piece of hard metal against the projecting rim of the case and it is readily turned down over the edge of the burnisher, C′, and takes the form designed by the shape in which the periphery of the burnisher is made.

Fig. 7 shows the form which would result from the use in the manner described of a burnisher shaped like C Fig. 3. When the edge is formed, by unscrewing the shank from the burnisher the tool from its peculiar shape can be readily removed from the metal of the case which has been pressed around it. The result of the whole operation is a half case possessing the full strength of the metal, more symmetrical in form and made in about one fifth the time necessary for making a half case by any method now known to me. Two half cases so formed can then be placed together—hinged and finished in the ordinary manner.

I do not claim the striking up of the halves of a case for watches or lockets by means of a die and former—neither do I claim the making of locket rims out of single pieces of metal instead of two or more, neither do I claim making the same out of sheet metal instead of wire; but What I do claim as my invention and desire to secure by Letters Patent is—

The shaping burnisher Fig. 3 or its equivalent for the purpose of producing a continuous rim from the same metal upon the halves of watch and locket cases constructed, applied, and operated in the manner and on the principle substantially as described.

HENRY A. PHILLIPS.

Witnesses:
ANDERSON C. ROSE,
BENJ. P. THURSTON.